United States Patent [19]

Tucker

[11] Patent Number: 5,052,699
[45] Date of Patent: Oct. 1, 1991

[54] GROMMET

[75] Inventor: Donald L. Tucker, Redwood City, Calif.

[73] Assignee: Raychem Corporation, Menlo Park, Calif.

[21] Appl. No.: 377,378

[22] Filed: Jul. 10, 1989

[51] Int. Cl.$^5$ ............................................. F16J 9/04
[52] U.S. Cl. ..................................... 277/178; 16/2; 174/153 G
[58] Field of Search .......................... 277/178; 16/2; 174/153 G, 65 G

[56] References Cited

U.S. PATENT DOCUMENTS

| | | | |
|---|---|---|---|
| 1,697,814 | 1/1929 | Forbes | 16/2 |
| 1,905,822 | 10/1930 | Dunn . | |
| 1,947,623 | 12/1931 | Shimer | 309/3 |
| 2,063,132 | 12/1936 | Sund | 16/2 |
| 2,468,985 | 5/1949 | Krotz | 16/2 |
| 2,895,408 | 7/1975 | Leingang | 16/2 |
| 3,065,004 | 11/1962 | Laich | 16/2 |
| 3,109,662 | 11/1963 | Bergstrom | 277/178 |
| 3,163,882 | 5/1963 | Falkenberg | 16/2 |
| 3,740,061 | 6/1973 | Jensen | 277/178 |
| 3,861,029 | 1/1975 | Smith-Johannsen et al. | 29/611 |
| 3,990,661 | 11/1976 | De Groef | 16/2 |
| 4,334,148 | 6/1982 | Kampe | 219/553 |
| 4,383,692 | 5/1983 | Proctor | 277/178 |
| 4,459,473 | 7/1984 | Kamath | 219/553 |
| 4,522,378 | 6/1985 | Nelson | 16/2 |
| 4,614,390 | 9/1986 | Baker | 339/61 |
| 4,733,015 | 3/1988 | Barnes | 174/65 SS |

FOREIGN PATENT DOCUMENTS

| | | | |
|---|---|---|---|
| 535041 | 1/1959 | Belgium | 16/2 |
| 2192674A | 8/1974 | France . | |
| 435152 | 9/1935 | United Kingdom | 277/178 |
| 1037048 | 7/1966 | United Kingdom . | |
| 1243572 | 8/1971 | United Kingdom . | |
| 1361492 | 7/1974 | United Kingdom . | |

Primary Examiner—William A. Cuchlinski, Jr.
Assistant Examiner—Daniel G. DePumpo
Attorney, Agent, or Firm—Marguerite E. Gerstner; Timothy H. P. Richardson; Herbert G. Burkard

[57] ABSTRACT

An elastomeric grommet suitable for sealing a substrate when compressed in an axial direction. The grommet is made so that an axial passageway has an inner central section of substantially constant cross-section and first and second inner end sections which taper inwardly from first and second radial surfaces, respectively, to define first and second entry portions for passage of the substrate. First and second outer end sections lie on either side of an outer central section. The outer central section defines a groove which runs circumferentially around the entire periphery of the grommet. The grommet is particularly useful for sealing a variety of sizes of strip heaters.

16 Claims, 2 Drawing Sheets

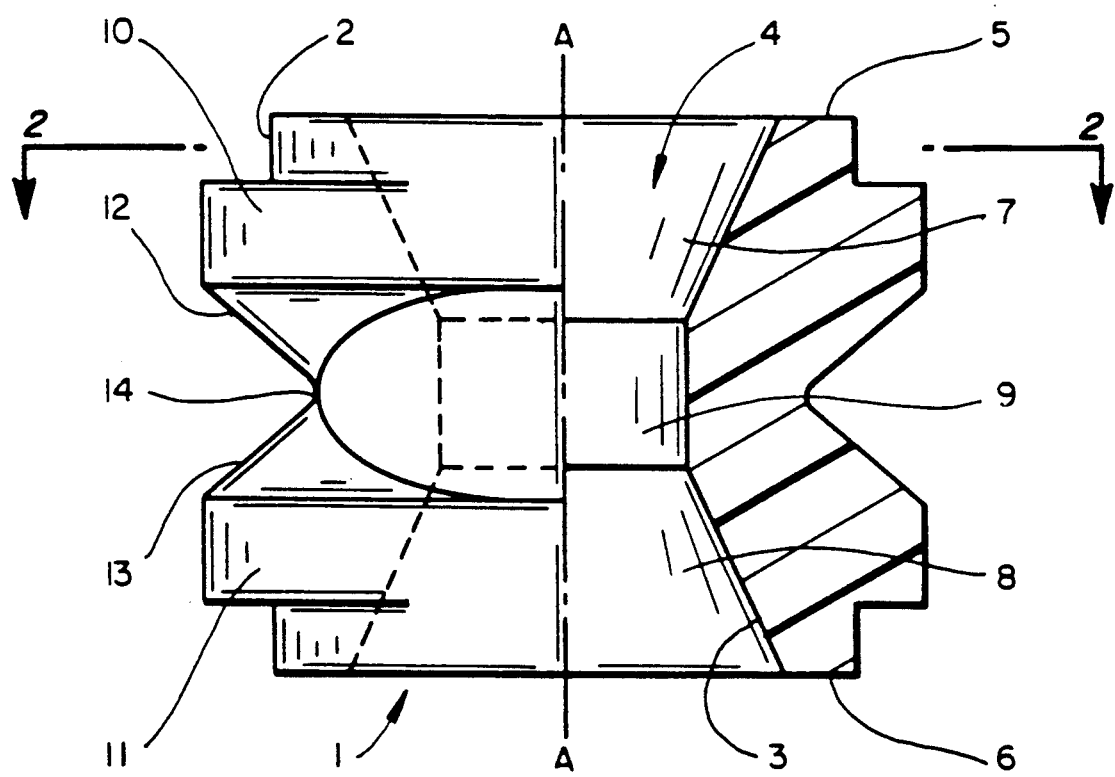
FIG_1

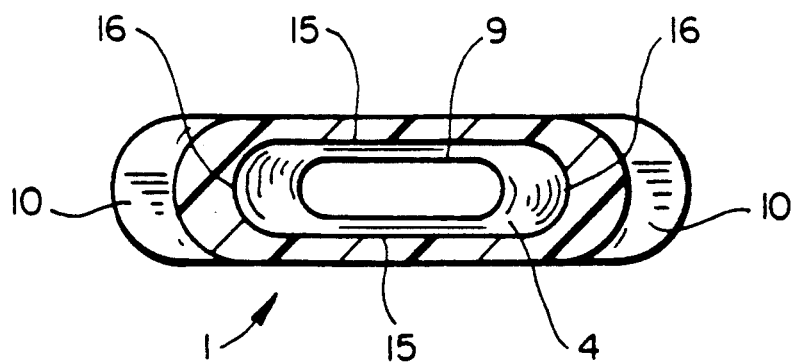
FIG_2
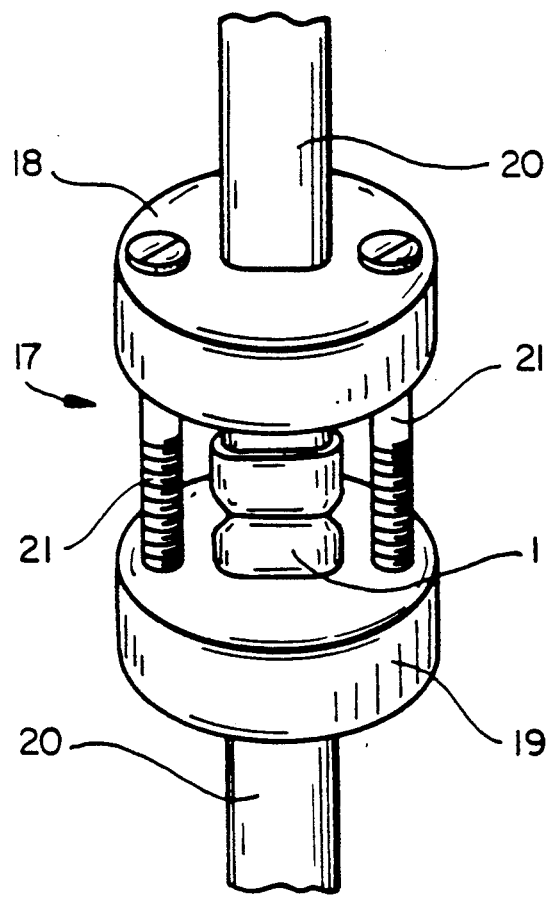
FIG_3

5,052,699

GROMMET

BACKGROUND OF THE INVENTION

1. Field of the Invention

This invention relates to devices, e.g. grommets, for gripping and sealing around elongate substrates, e.g. strip heaters.

2. Introduction to the Invention

Elongate substrates, e.g. electrical leads or strip heaters, must be sealed at each power connection, splice, tee, or end termination in order to provide electrical insulation and environmental protection. A conventional method of making such a seal is with an elastomeric grommet or sealing ring. Devices of this type are disclosed in U.S. Pat. Nos. 3,109,662 (Bergstrom), 3,163,882 (Falkenberg) and 4,383,692 (Proctor) and British Patent Nos. 1,037,048 (Cottrell) and 1,361,492 (Hamblin), the disclosures of which are incorporated by reference herein. Such conventional grommets must be sized for each individual application in order to provide adequate sealing, pullout force, and strain relief to the elongate conductor. As a result, for a length of conductor on which a number of connections, splices, or terminations are to be made, a large number of grommets must be available.

Some grommets, such as that disclosed in U.S. Pat. No. 4,614,390 (Baker), the disclosure of which is incorporated by reference herein, are designed with a peripheral groove so that under compression the two halves of the grommet on either side of the groove can collapse to form a stronger seal on the conductor. Because the center bore for this grommet is of uniform diameter, the grommet must still be sized for each application.

SUMMARY OF THE INVENTION

I have now found that a grommet suitable for gripping and sealing a wide variety of conductor sizes and applications can be made by providing an axial passageway which has both tapered and constant diameter sections. In a first aspect, this invention discloses an annular grommet which is composed of an elastomeric material and which has an outer circumferential surface, an inner circumferential surface, a first radial surface, and a second radial surface;

the inner circumferential surface (1) defining an axial passageway which (i) runs axially through the grommet and (ii) has an axial length x inch, and (2) comprising
- (a) a first inner end section which tapers inwardly from the first radial surface and which defines a first entry portion of the passageway,
- (b) a second inner end section which tapers inwardly from the second radial surface and which defines a second entry portion of the passageway, and
- (c) an inner central section which (i) lies between the inner end sections, (ii) has a substantially constant cross-section, (iii) has an axial length of 0.10x to 0.60x inch, and (iv) defines a central portion of the passageway; and the outer circumferential surface comprising
- (a) a first outer end section which (i) has a substantially constant cross-section, and (ii) has axial length of 0.15x to 0.45x inch,
- (b) a second outer end section which (i) has a substantially constant cross-section, and (ii) has an axial length of 0.15x to 0.45x inch, and
- (c) an outer central which lies between the outer end sections and which defines a groove which runs circumferentially around the entire periphery of the grommet, the groove having tapered walls which taper to a base which lies within a radial projection of the inner central section;

whereby an elongate substrate can be placed in the passageway and the grommet can be axially compressed to seal around and to grasp the substrate.

In a second aspect, the invention provides a sealing device which comprises
(1) a grommet as described in the first aspect of the invention;
(2) a first housing member and a second housing member which can be assembled together to form a chamber for the grommet; and
(3) means for drawing the first housing member and the second housing member together along the axis of a grommet placed with in the chamber thereby axially compressing the grommet.

In a third aspect, the invention provides an assembly comprising
(1) a sealing device as described in the second aspect of the invention; and
(2) an elongate substrate, e.g. a strip heater, which is inserted through the passageway of the grommet and is grasped and sealed by the grommet.

BRIEF DESCRIPTION OF THE DRAWING

FIG. 1 shows the grommet of the invention, partially in plan view and partially in cross-section.

FIG. 2 is a cross-sectional view of the grommet of the invention along line 2—2 of FIG. 1; and FIG. 3 is an exploded view of a sealing device of the invention.

DETAILED DESCRIPTION OF THE INVENTION

The grommets of the invention are suitable for gripping and sealing any elongate substrate, but are most often used with elongate strip heaters. Such heaters comprise elongate electrodes, e.g. wires, a plurality of resistive heating elements which are connected in parallel between the electrodes, and an optional insulating jacket which surrounds the heating elements and the electrodes. Self-regulating strip heaters in which the resistive heating elements comprise a conductive polymer composition are particularly suitable. Such heaters generally have an approximately rectangular cross-section with two generally parallel faces, although other geometries, e.g. dogbone, elliptical, oval, or round, are also used. Heaters of this type are well-known; see, for example, U.S. Pat. Nos. 3,861,029 (Smith-Johannsen et al), 4,334,148 (Kampe), and 4,459,473 (Kamath), the disclosure of each of which is incorporated herein by reference.

The grommet of the invention is annular, i.e. it has an outer circumferential surface, a first radial surface and a second radial surface; an axial passageway runs from the first radial surface to the second radial surface through the grommet. The passageway extends down the entire length of the grommet, thus creating a bore or cavity into which the elongate substrate can be inserted. The first radial surface and the second radial surface are normally parallel to one another and perpendicular to the axis of the passageway. The outer circumferential surface can comprise adjacent either one or both of the radial surfaces a lip of lesser diameter. In a preferred embodiment, the grommet is symmetrical about a plane at right angles to the axis of the passageway.

The axial length of the grommet measured from the first radial surface to the second radial surface through the passageway is x inch, where x is measured prior to any compression or other deformation of the grommet during the connection process. All dimensions referred to in this specification are measured with the grommet in an uncompressed, undeformed state.

The wall of the passageway is defined by the inner circumferential surface of the grommet. The passageway may be of any cross-sectional shape, but normally conforms to the shape of the outer circumferential surface. Although this shape may be round, elliptical, or oval depending on the cross-sectional shape of the substrate, it is preferred that the shape of both the outer circumferential surface and the inner circumferential surface have a cross-section of generally rectangular shape with rounded ends, i.e. a cross-section defined by two parallel lines joined at each end by a semi-circle. In general, the major dimension of the cross-section of the passageway is from 0.3x to 1.0x inch, preferably from 0.5x to 0.9x inch, at the widest point of the passageway, and from 0.2x to 0.7x inch, preferably from 0.3x to 0.5x inch, at the narrowest point of the passageway.

The inner circumferential surface comprises three notional parts: a first inner end section, a second inner end section, and an inner central section which lies between the two inner end sections. The first inner end section tapers from the first radial surface, its widest portion defining a first entry portion of the passageway. The second inner end section tapers from the second inner end section, its widest portion defining a second entry portion of the passageway. The taper is generally a constant taper. The inner central section defines a central portion of the passageway and has an axial length of 0.10x to 0.60x inch, preferably 0.15x to 0.5x inch, particularly 0.20x to 0.40x inch, e.g. 0.30x inch. For a substrate of given geometry, the pullout force, as discussed below, increases as the length of the inner central section increases, up to a maximum value which is dependent on a number of factors, including the type of elastomeric material used and the shape of the grommet. The inner central section is of substantially constant cross-section. In this specification, "substantially constant cross-section" is defined as a cross-section in which any variation is relatively small by comparison with the taper of the entry portions, e.g. the major dimension of the cross-section in the inner central section varies by at most 0.01x from the average major dimension of the cross-section of the inner central section. Thus it is possible to have small ribs or grooves, either axially or circumferentially, in the inner central section for physical reinforcement, while maintaining a substantially constant cross-section.

Like the inner circumferential surface, the outer circumferential surface comprises three notional sections. Each of the first outer end section and the second outer end section has a substantially constant cross-section and an axial length of 0.15x to 0.45x inch, preferably 0.20x to 0.40x inch. The first and the second outer end sections may be the same, which is preferred, or different in length and geometry. The third section is the outer central section which lies between the outer end sections and which defines a groove which runs circumferentially around the entire periphery of the grommet. The groove has tapered walls which taper to a base which lies within a radial projection of the inner central section. It is preferred that the base be radiused, i.e. that the tapered walls do not come to a sharp point. This helps provide mechanical reinforcement and prevent tearing during manufacture and compression. Upon axial compression, the groove allows space for the compressed material to occupy.

For most applications, it is preferred that the grommet be monolithic, i.e. comprise a single piece, although grommets with two or more separable parts can be used. For ease of manufacture and installation onto the substrate, the first and second outer end sections are preferably symmetrical on either side of the outer central section. Although this symmetry can minimize craft sensitivity during installation and eliminate the need to ensure that the correct "end" is attached to the substrate, there may be applications in which either the first or the second outer end section is different from the other, e.g. is longer or has a different cross-section.

Grommets of the invention comprise an elastomeric material which is capable of being compressed in the axial direction when formed into a grommet. Selection of the appropriate material is a function of the modulus and elasticity of the polymer, and the amount of compression desired for a particular application. Suitable materials are those which have a Shore A hardness of 30 to 70, preferably 35 to 65. Materials with lower Shore A numbers, e.g. 35, provide more elasticity and are appropriate for substrates which have a relatively large size with respect to the size of the passageway. Materials with higher Shore A numbers, e.g. 65, provide more gripping force for substrates which are relatively small with respect to the size of the passageway. Suitable elastomers include neoprenes and fluorinated materials such as vinylidene fluoride/hexafluoropropylene copolymer. Particularly preferred are silicones, especially engineering grades of silicone which are designed for high temperature applications.

When making a connection it is important that the heater or other elongate substrate be held in position with sufficient strength so that it cannot readily be pulled out of the grommet. In general, a pullout force of at least 10 pounds, preferably at least 15 pounds, particularly at least 20 pounds, especially at least 25 pounds, is required for routine use. The pullout force is measured with an Instron tensile testing apparatus. The heater is gripped by one jaw of the Instron and the grommet by the other jaw. The force required to pull the heater 0.125 inch (0.318 cm) out of the grommet when the jaw holding the grommet is stationary and the jaw holding the heater is moved is measured.

While the grommet may be used by itself, e.g. when the substrate is of such a size that it has an interference fit with the grommet and achieves adequate sealing, it is most often part of a sealing device or an assembly. The device normally comprises a first housing member and a second housing member which can be assembled to form a chamber for the grommet. The housing members can be connected to one another by a snap fit, one or more screws, external straps or cables, or other suitable means. The means are such that when the members are drawn together along the axis of a grommet placed within the chamber, the grommet is axially compressed. When compressed, the axial length of the compressed grommet is 0.1x to 0.6x inch, preferably 0.3x to 0.65x inch. For engineering grade high temperature silicones, the grommet is at its functional gripping maximum level at a length of about 0.68x inch.

Grommets of the invention are suitable for use on substrates of a variety of different geometries and sizes. In general, in order to achieve effective sealing even without compression, a grommet should be designed so that the circumference of the smallest substrate is slightly larger than the circumference of the inner central section and the circumference of the first inner end section at the first radial surface (i.e. the circumference of the opening of the passageway) is about 1.4 to 1.5 times the circumference of the largest substrate. Using these guidelines, substrates which have a circumference of y to about 2y inch can be accommodated using a single grommet.

Referring to the drawing, FIG. 1 illustrates grommet 1 in both plan and cross-sectional views on either side of axis line A—A. The grommet 1 has an outer circumferential surface 2, and inner circumference 3 defines an axial passageway 4 which extends from a first radial surface 5 to a second radial surface 6. The passageway 4 comprises a first inner end section 7, a second inner end section 8, and an inner central section 9. The first outer end section 10 and the second outer end section 11 lie on either side of a peripheral groove which is defined by tapered walls 12, 13 and a base 14. The base 14 lies within a radial projection of the inner central section 9.

FIG. 2 shows the grommet 1 of FIG. 1 in cross-section along line 2—2. The passageway 4 has a cross-section which is defined by two parallel sides 15 which are connected at each end by a semi-circle 16. The most narrow section of the passageway 4 defines the circumference of the inner central section 9.

FIG. 3 shows a sealing device 17 of the invention prior to axial compression. The sealing device 17 comprises a first housing member 18 and a second housing member 19. A elongate substrate 20, illustrated here as a strip heater, is inserted into the grommet 1 and the grommet 1 is positioned into a chamber formed in or by the first and second housing members. The first and second housing members are connected by means of screws 21 which, when tightened, cause the grommet 1 to be compressed in an axial direction.

I claim:

1. An annular grommet which is composed of an elastomeric material and which has an outer circumferential surface, an inner circumferential surface, a first radial surface, and a second radial surface;

the inner circumferential surface (1) defining an axial passageway which (i) runs axially through the grommet and (ii) has an axial length x inch, and (2) comprising
  (a) a first inner end section which tapers inwardly from the first radial surface and which defines a first entry portion of the passageway,
  (b) a second inner end section which tapers inwardly from the second radial surface and which defines a second entry portion of the passageway, and
  (c) an inner central section which (i) lies between the inner end sections, (ii) has a substantially constant cross-section, (iii) has an axial length of 0.10x to 0.60x inch, and (iv) defines a central portion of the passageway; and the outer circumferential surface comprising
  (a) a first outer end section which (i) has a substantially constant cross-section, and (ii) has an axial length of 0.15x to 0.45x inch,
  (b) a second outer end section which (i) has a substantially constant cross-section, and (ii) has an axial length of 0.15x to 0.45x inch, and
  an outer central section which lies between the outer end sections and which defines a groove which runs circumferentially around the entire periphery of the grommet, the groove having tapered walls which taper to a base which lies within a radial projection of the inner central section;

whereby an elongate substrate can be placed in the passageway and the grommet can be axially compressed to seal around and to grasp the substrate.

2. A grommet according to claim 1 wherein the grommet is symmetrical about a plane at right angles to the axis of the substrate.

3. A grommet according to claim 1 wherein the major dimension of the cross-section of the passageway is from 0.30x to 1.0x inch at the widest point of the passageway and from 0.20x to 0.70x inch at the narrowest point of the passageway.

4. A grommet according to claim 3 wherein the major dimension is from 0.50x to 0.90x inch at the widest point and from 0.30x to 0.50x inch at the narrowest point.

5. A grommet according to claim 1 wherein the passageway has a cross-section defined by two parallel lines joined at each end by a semi-circle.

6. A grommet according to claim 1 wherein the inner central section has an axial length of 0.15x to 0.5x inch.

7. A grommet according to claim 6 wherein the inner central section has an axial length of 0.20x to 0.40x inch.

8. A grommet according to claim 1 wherein the first outer end section and the second outer end section each have an axial length of 0.20x to 0.40x inch.

9. A grommet according to claim 1 wherein the grommet is monolithic.

10. A grommet according to claim 1 which comprises separable parts.

11. A sealing device which comprises
  (1) an annular grommet which is composed of an elastomeric material and which has an outer circumferential surface, an inner circumferential surface, a first radial surface, and a second radial surface;

the inner circumferential surface surface (A) defining an axial passageway which (i) runs axially through the grommet and (ii) has an axial length x inch, and (B) comprising
  (a) a first inner end section which tapers inwardly from the first radial surface and which defines a first entry portion of the passageway,
  (b) a second inner end section which tapers inwardly from the second radial surface and which defines a second entry portion of the passageway, and
  (c) an inner central section which (i) lies between the inner end sections, (ii) has a substantially constant cross-section, (iii) has an axial length of 0.10x to 0.60x inch, and (iv) defines a central portion of the passageway; and the outer circumferential surface comprising
  (a) a first outer end section which (i) has a substantially constant cross-section, and (ii) has an axial length of 0.15x to 0.45x inch,
  (b) a second outer end section which (i) has a substantially constant cross-section, and (ii) has an axial length of 0.15x to 0.45x inch, and (c) an outer central section which lies between the outer end sections and which defines a groove which runs circumferentially around the entire periphery of the grommet, the groove having tapered walls which taper to a base which lies within a radial projection of the inner central section;

(2) a first housing member and a second housing member which can be assembled together to form a chamber for the grommet; and (3) means for drawing the first housing member and the second housing member together along the axis of a grommet placed within the chamber thereby axially compressing the grommet.

12. A device according to claim 11 wherein the means of drawing the first and the second housing members together comprises at least one screw.

13. An assembly comprising (1) an annular grommet which is (A) composed of an elastomeric material, (B) has been axially compressed, and (C) when it is not compressed has an outer circumferential surface, an inner circumferential surface, a first radial surface, and a second radial surface;

the inner circumferential surface defining an axial passageway which (i) runs axially through the grommet and (ii) has an axial length x inch, and comprising (a) a first inner end section which tapers inwardly from the first radial surface and which defines a first entry portion of the passageway, (b) a second inner end section which tapers inwardly from the second radial surface and which defines a second entry portion of the passageway, and (c) an inner central section which (i) lies between the inner end sections, (ii) has a substantially constant cross-section, (iii) has an axial length of 0.10x to 0.60x inch, and (iv) defines a central portion of the passageway; and the outer circumferential surface comprising (a) a first outer end section which (i) has a substantially constant cross-section, and (ii) has an axial length of 0.15x to 0.45x inch, (b) a second outer end section which (i) has a substantially constant cross-section, and (ii) has an axial length of 0.15x to 0.45x inch, and (c) an outer central section which lies between the outer end sections and which defines a groove which runs circumferentially around the entire periphery of the grommet, the groove having tapered walls which taper to a base which lies within a radial projection of the inner central section;

(2) a first housing member and a second housing member which are assembled together to form a chamber surrounding the grommet;

(3) means for (a) drawing the first housing member and the second housing member together along the axis of a grommet placed within the chamber thereby axially compressing the grommet, and (b) maintaining the first and second members in a position such that the grommet is compressed, said means having been operated so that the grommet has been axially compressed; and (4) an elongate substrate which passes through the passageway of the grommet and is grasped and sealed by the grommet.

14. An assembly according to claim 13 wherein the elongate substrate is a strip heater.

15. An assembly according to claim 13 wherein the axial length of the compressed grommet is 0.10x to 0.60x inch.

16. An assembly according to claim 15 wherein the axial length of the compressed grommet is 0.30x to 0.65x inch.

* * * * *